Figure 1:
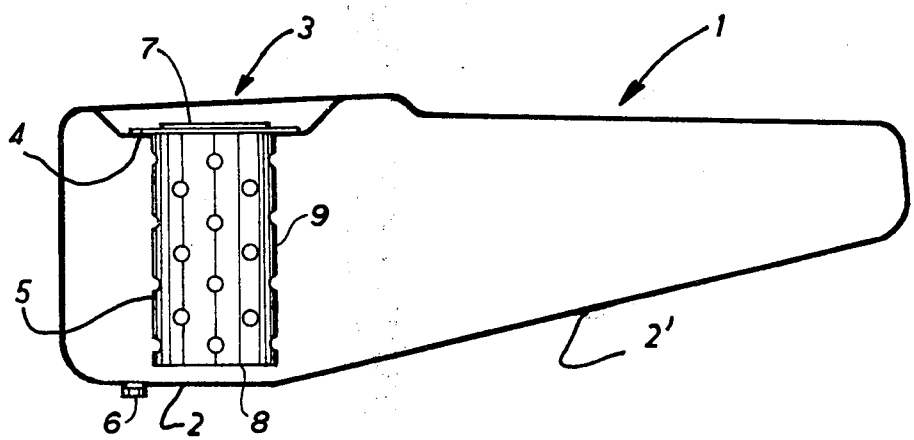

United States Patent [19]

Gallay

[11] 3,905,505

[45] Sept. 16, 1975

[54] FUEL TANK FOR AUTOMOBILE VEHICLES

[75] Inventor: Francis J. Gallay, Boulogne-sur-Seine, France

[73] Assignee: Techni-Plaste S.A., Paris, France

[22] Filed: Oct. 5, 1973

[21] Appl. No.: 403,905

[30] Foreign Application Priority Data

Oct. 17, 1972 France .............................. 72.36662

[52] U.S. Cl. ................................. 220/22; 220/86 R
[51] Int. Cl.² ......................................... B65D 85/00
[58] Field of Search ........ 220/22, 86 R, 86 T, 88 R; 137/574

[56] References Cited
UNITED STATES PATENTS

| | | |
|---|---|---|
| 1,394,742 | 10/1921 | Kramer .............................. 220/22 X |
| 2,010,445 | 8/1935 | Sparks ................................ 220/86 R |
| 2,234,393 | 3/1941 | Amiot ............................ 220/86 R X |
| 2,242,671 | 5/1941 | Godber .............................. 220/86 R |
| 2,356,327 | 8/1944 | Lebus ............................. 220/86 R X |
| 2,379,735 | 7/1945 | Meikle ........................... 220/86 R X |
| 2,602,465 | 7/1952 | Goehring ....................... 220/86 R X |
| 3,349,953 | 10/1967 | Conaway et al. ............. 220/88 R X |

*Primary Examiner*—William I. Price
*Assistant Examiner*—Steven M. Pollard
*Attorney, Agent, or Firm*—Clelle W. Upchurch

[57] ABSTRACT

Fuel tank for automobile vehicles comprising a perforated enclosure closed laterally and hanging over the withdrawal zone so that the fuel contained in said enclosure can escape from it laterally but only while being slowed up.

3 Claims, 2 Drawing Figures

FUEL TANK FOR AUTOMOBILE VEHICLES

This invention relates to fuel tanks for automobile vehicles.

In these tanks, withdrawal occurs in the lower zone so that means must be provided in order to avoid the absence of fuel in the withdrawal zone for certain inclinations of the vehicle. In known metal tanks, these means consist of baffles welded at the bottom of the tank.

When these tanks are to be made of blown plastics, it is no longer possible or extremely difficult to provide blades or separations at the bottom of the tank.

Consideration was therefore given to the use of the trap located at the upper part of the tank the locking plate of which carries, in particular, the fuel gauge, in order to introduce into the tank, means attached to the upper part of the tank and hanging over the withdrawal zone for preventing the absence of fuel in the withdrawal zone.

The invention relates therefore to a fuel tank for automobile vehicles comprising a perforated enclosure closed laterally and hanging over the withdrawal zone so that the fuel contained in said enclosure can escape from it laterally but only while being slowed up. It can be seen, therefore, that the fuel located inside this enclosure, upon motion of the vehicle which imparts centrifugal effect to the fuel, can escape from the enclosure but slowly, as a function of the density of the perforations, so that it may be ascertained that fuel still remains in the withdrawal zone and that any absence of fuel in the withdrawal zone is thus avoided.

Said enclosure is advantageously integral with the gauge supporting plate.

This makes it possible to have a very simple tank, in which the enclosure is detachable, or is made out of a single piece, on this plate.

Said enclosure preferably consists of a perforated tube. The perforated tube preferably has a section the dimensions of which are substantially equal to those of the gauge supporting plate.

Figure 2:
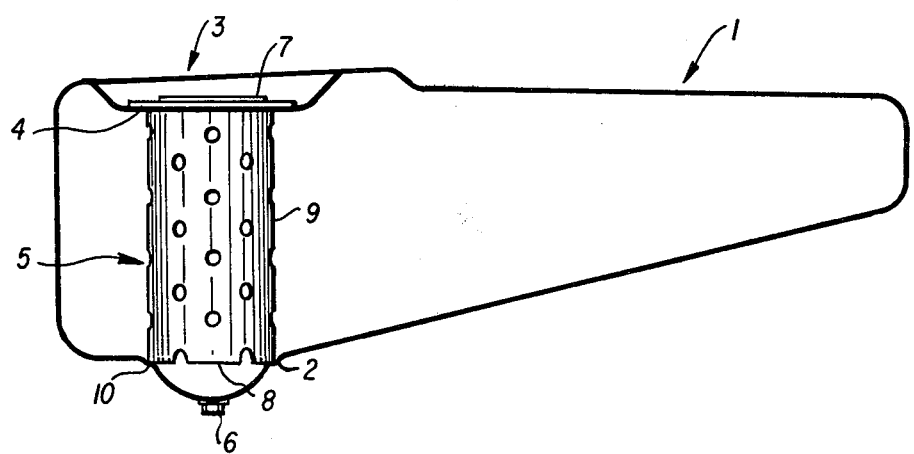

The invention will be more fully understood upon reading the following description with reference to the appended drawing in which FIG. 1 is a longitudinal vertical sectional schematic view of a first embodiment of a tank according to the invention and FIG. 2 is a longitudinal vertical sectional schematic view of a second embodiment of such a tank.

In FIG. 1 the tank 1 comprises, as is know, a lateral zone in which bottom 2 and upper surface 3 are substantially horizontal, this zone extending through a thinner zone in which bottom 2' is inclined with respect to the horizontal. Withdrawal of fuel occurs in the vicinity of horizontal bottom 2.

In upper surface 3, an opening is cut out which is closed by a plate 4 acting, in particular, as a support for the gauge system, with one vent hole, etc...

On the internal face of plate 4 is attached a perforated tube 5 positioned in the vicinity of bottom 3 leaving, however, a certain clearance. Tube 4 is close to the rim of plate 4 and if the latter is rectangular, tube 4 will be a cylinder with a rectangular section. Tube 4 can of course have a different shape.

The tube 5 comprises a perforated lateral wall 9, an upper open end 7 fixed to the plate 4 and a lower open end 8 located in the vicinity of the withdrawal outlet 6.

In FIG. 2, the tube 5 bears by its lower end 8 against a shoulder 10 present at the bottom 2 of the tank and surrounding the withdrawal orifice 6.

When the tank is inclined with respect to the vertical for a short period of time (turn) and the liquid contained in the tank has a tendency, through a centrifugal effect, to leave the withdrawal zone close to bottom 2, this liquid is strongly slowed up by the perforated tube 5 the major part of which it can cross only through the perforations. The constant presence of fuel is thus ascertained in the withdrawal zone even during the rather short period involving centrifugal effects which tend to draw the fuel away from it.

The perforations may be of various sizes, for example, larger at the top of the enclosure and smaller at the bottom.

Provision is advantageously made so that the tank zone supporting the perforated enclosure has a certain elasticity so that strains in the tank which might be due to an increase in pressure inside the tank may be absorbed. This elasticity, for example, may be obtained by providing the tank with an undulation surrounding the perforated enclosure.

Provision may also be made so that the perforated enclosure bears against a shoulder present at the bottom of the tank and surrounding the withdrawal orifice.

What I claim is:

1. A fuel tank for a vehicle having a housing enclosing a fuel storage space, said housing having top and bottom walls, an aperture in said bottom wall for flow of fuel therefrom, and means for retarding flow of fluid in said space from over the aperture when the tank tilts with the portion having the aperture in an elevated position, said means comprising a tubular member having open ends and a plurality of openings in its wall for flow of fluid transversely therethrough, said tubular member being secured at one end to said top wall and having its opposite end disposed in spaced relation with the bottom wall adjacent to the said aperture.

2. A fuel tank for automobile vehicles comprising a gauge supporting plate, a bottom wall, aa fuel withdrawal outlet located on said bottom wall and a tubular enclosure having an upper open end, a lower open end and a perforated lateral wall, said upper end being fixed to said gauge supporting plate and said bottom end being located in the vicinity of said withdrawal outlet.

3. Fuel tank according to claim 2, wherein the perforated enclosure bears against a shoulder present at the bottom of the tank and surrounding the withdrawal orifice.

* * * * *